(12) United States Patent
Kiest, Jr.

(10) Patent No.: US 8,715,800 B2
(45) Date of Patent: May 6, 2014

(54) APPARATUS AND METHOD TO REPAIR THE JUNCTION OF A SEWER MAIN LINE AND LATERAL PIPE

(75) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 806 days.

(21) Appl. No.: 12/710,113

(22) Filed: Feb. 22, 2010

(65) Prior Publication Data

US 2011/0203719 A1 Aug. 25, 2011

(51) Int. Cl.
| B29C 73/00 | (2006.01) |
| B32B 43/00 | (2006.01) |
| B65C 3/26 | (2006.01) |
| B65C 3/16 | (2006.01) |
| B29C 65/00 | (2006.01) |
| B32B 37/00 | (2006.01) |
| B29C 47/00 | (2006.01) |
| B29D 22/00 | (2006.01) |
| B29D 23/00 | (2006.01) |
| B32B 1/08 | (2006.01) |
| F16L 55/16 | (2006.01) |

(52) U.S. Cl.
USPC ............ 428/36.9; 156/94; 156/156; 156/215; 156/287; 156/294; 138/96

(58) Field of Classification Search
USPC ......... 156/60, 71, 94, 98, 156, 196, 198, 212, 156/214, 215, 217, 218, 278, 285, 287, 293, 156/294, 296, 307.1, 307.3, 307.7; 138/97, 138/98, 99; 428/34.1, 35.7, 36.1, 36.5, 428/36.8, 36.9, 36.91
See application file for complete search history.

(56) References Cited

U.S. PATENT DOCUMENTS

| 2002/0157784 A1* | 10/2002 | Kiest, Jr. ................. 156/287 |
| 2003/0116211 A1 | 6/2003 | Ward |
| 2005/0121092 A1* | 6/2005 | Kiest et al. ............... 138/98 |
| 2009/0194184 A1 | 8/2009 | Kiest, Jr. |

FOREIGN PATENT DOCUMENTS

WO 2009029516 A1 3/2009

* cited by examiner

*Primary Examiner* — Philip Tucker
*Assistant Examiner* — Brian R Slawski
(74) *Attorney, Agent, or Firm* — McKee, Voorhees & Sease

(57) ABSTRACT

A liner assembly and method for lining a damaged pipe junction between a main and lateral pipe is provided. The liner assembly includes a main liner member and a lateral liner tube. A collar disposed near the juncture between the main liner member and lateral liner tube is impregnated with a liquid hydrophobic or hydrophilic material capable of curing in a flexible or rigid state with the material expanding in the presence of water. The hydrophobic or hydrophilic material can also be applied without the use of the collar. When the liner assembly is pressed against the main and lateral pipes, a portion of the hydrophilic or hydrophobic material is forced into the damaged pipe junction.

20 Claims, 4 Drawing Sheets

APPARATUS AND METHOD TO REPAIR THE JUNCTION OF A SEWER MAIN LINE AND LATERAL PIPE

FIELD OF THE INVENTION

The present invention relates generally to sewer pipe line repair, and more particularly to an improved method and apparatus for repairing the juncture of a sewer main pipe and a lateral pipe.

BACKGROUND OF THE INVENTION

Prior methods for repairing damaged portions of pipelines include moving a liner tube impregnated with a liquid material capable of curing and hardening to a position within the pipe where the damaged portion is located. The liner tube is installed by pulling, pushing, or everting the liner into the host pipe. Once the liner is positioned within the host pipe, it is pressurized, usually by an inflation bladder, causing the liner to press against the interior wall of the host pipe, and the liner is cured by applying heat, such as steam or hot water. These liners can also be cured at ambient temperatures by a chemical mixture which generates an exothermic reaction. The liner tube forms an interior liner in the pipe for the pipeline being repaired. Such a process is known as cured-in-place pipelining.

Lateral or branch pipes are connected to main pipes. In many cases, the connection of lateral pipes to main sewer pipes is accomplished by forming a hole in the main line with a hammer. The lateral pipe is then simply abutted against the hole, and then the juncture is covered with mortar, dirt, or the like. Damage or leaking can occur at the junction between the lateral pipe and the main pipe, which is generally known as one of the weakest points in a collection sewer system. T-shaped or Y-shaped liner tubes have been utilized to fit within the junction between the lateral and main pipes. Liner tubes form a T-shaped or Y-shaped liner after hardening to the interior of the junction between the pipes. Again, inflation bladders are typically used to pressurize the liners against the interior walls of the host pipes.

The liner tubes are often impregnated with a resinous material, which cures and hardens with the addition of either heat or an independent exothermic reaction. At the main and lateral junction, however, the damaged areas often allow the leakage of water. The junction is located at the lowest spot underground of the lateral pipe. Therefore, it is only natural for the water to flow to the area around the junction of the main and lateral pipe. Water tends to seep through the fractures and joints of the junction, and will interact with the resin impregnated liner, and in turn, the liner may not be able to cure to fully repair the junction.

One approach is to inject an expandable liquid grout through the pipe juncture defects so the fluid grout permeates into the soil surrounding the main and lateral pipes. These expandable grouts are activated faster when in communication with water. The grout expands five times its original volume, sealing all points of leakage. A disadvantage to injecting grout first and then inserting a cured-in-place pipe (CIPP) liner is the time and labor necessary to insert two different pieces of equipment in the main pipe and to robotically position those devices with multiple lateral connections. The result is a much greater cost, as the multiple processes would take more time and potentially more people to repair the different areas of the pipe.

Accordingly, there is a need in the art for an improved lining method and apparatus that overcomes the problems resulting from ground water being allowed to penetrate the junction of the main and lateral pipes during the installation process. There is also a need in the art for an improved means and method for lining the junction of the main and lateral pipes that does not require the use of multiple apparatus or lining procedures.

BRIEF SUMMARY OF THE INVENTION

It is therefore a principal object, feature, or advantage of the present invention to provide an improved apparatus and method for repairing the juncture of a main sewer line with a lateral pipe.

Another object, feature, or advantage of the present invention is to provide an improved method and apparatus for repairing the juncture of a main line and lateral pipe in the presence of water leaking into the juncture.

Another object, feature, or advantage of the present invention is to provide an improved method and apparatus for repairing the juncture of a lateral with a main line which may be accomplished from the sewer main line.

Another object, feature, or advantage of the present invention is to provide an improved method and apparatus for repairing both the juncture of a lateral with a main line and the lateral line itself.

Yet, another object, feature, or advantage of the present invention is to make a seal between the main and lateral pipe on the outside of the pipe junction and not reduce the inner diameter of the pipe more than approximately the thickness of the pipe liner.

These and other objects, features, and advantages of the present invention will be apparent to those skilled in the art.

According to one aspect of the invention, a liner assembly for lining the junction between a main pipe and a lateral pipe is provided. The liner assembly includes a main liner member, a lateral liner tube, and a collar. The main liner member has a main liner member opening therein. The lateral liner tube extends from the main liner member about the main liner member opening. The collar is disposed at least partially on the main liner member adjacent the main liner member opening and is impregnated with a liquid hydrophobic or hydrophilic material capable of curing and hardening and the material expanding in the presence of water.

According to another aspect of the invention, a liner assembly for lining the junction between a main pipe and a lateral pipe is provided. The liner assembly includes a main liner member, a lateral liner tube, and a collar. The main liner member has a first end and a second end and an opening in between. The lateral liner tube extends from the main liner member about the main liner member opening. The collar has a first section disposed at least partially on the main liner member adjacent the main liner member opening and a second section extending at least partially from the main liner member about the main liner member opening. The collar is impregnated with either a hydrophilic or hydrophobic material capable of curing and expanding.

According to another aspect of the invention, a liner assembly for lining the junction between a main pipe and a lateral pipe of the sewer is provided. The liner assembly includes a main bladder tube, a lateral bladder tube, a lateral liner tube, a main liner member and a collar. The lateral liner tube extends at least partially within the lateral bladder, and the lateral liner tube can be operably positioned to an everted position outside the lateral bladder tube. The main liner member is joined to an end of the lateral liner tube about an opening in the main liner member. The collar is disposed at least partially on the main liner member adjacent the main liner member opening and is impregnated with either a hydrophilic or hydrophobic material capable of curing and expanding.

According to another aspect of the invention, a method of repairing a damaged pipe junction between a main pipe and a lateral pipe of a sewer is provided. The method includes providing an apparatus including a main liner member, a lateral liner tube, and a collar. The main liner member and the lateral liner tube are impregnated with a resinous material capable of curing and hardening. The collar is impregnated with either a hydrophilic or hydrophobic material capable of curing and expanding. The apparatus is moved through a main pipe to a position with the collar adjacent a pipe junction. As the main liner member and lateral liner tube are pressed against the host pipes, the collar is compressed, which in turn forces at least a portion of the hydrophobic or hydrophilic material toward the damaged pipe junction and expand in the presence of water. In a preferred form, the portion of hydrophobic or hydrophilic material is forced to the outside of the damaged pipe junction. As an alternative to using a collar as the carrier or transport member for the hydrophilic or hydrophobic material, a highly viscous form of the hydrophilic or hydrophobic material compatible with the resinous material can be applied to the main and/or lateral liner near the juncture therebetween.

DETAILED DESCRIPTION OF THE PREFERRED EMBODIMENT

Figure 1:
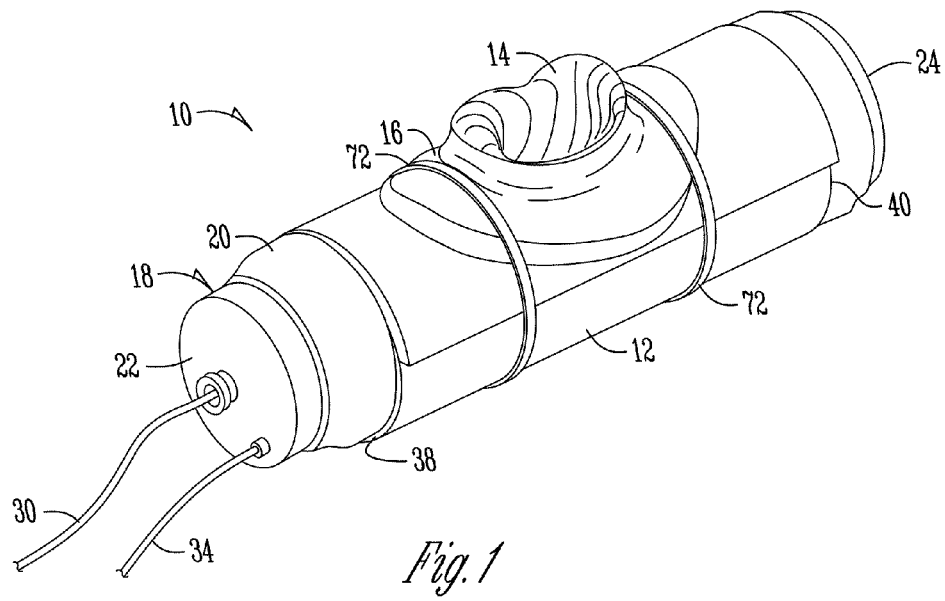
FIG. 1 is a perspective view of a liner assembly for repairing the junction between a main pipe line and a lateral pipe line.
Figure 2:
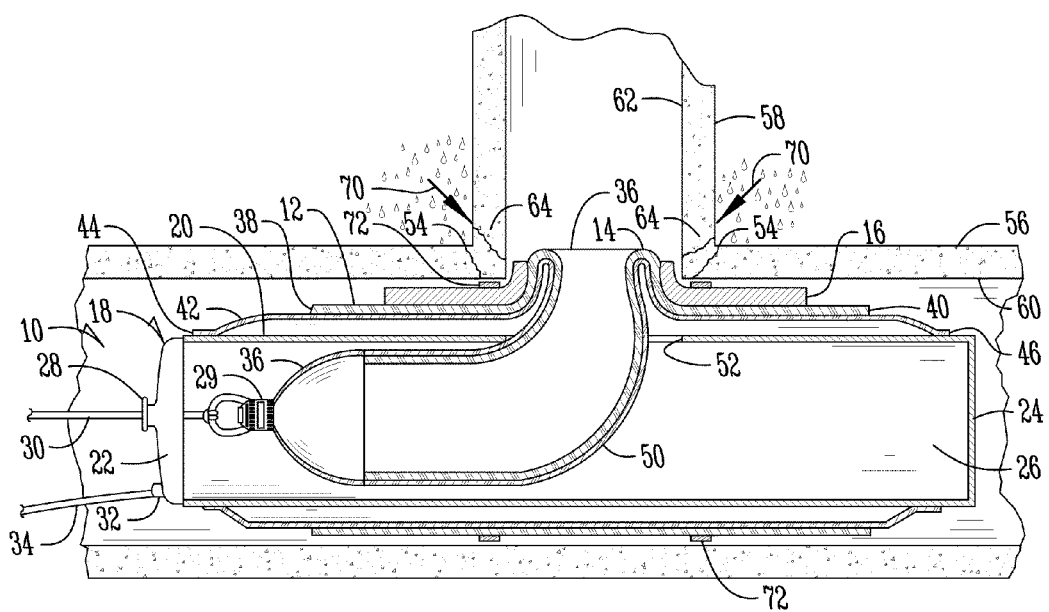
FIG. 2 is a section view of a main pipe line and a lateral pipe line showing one embodiment of the present invention.
Figure 3:
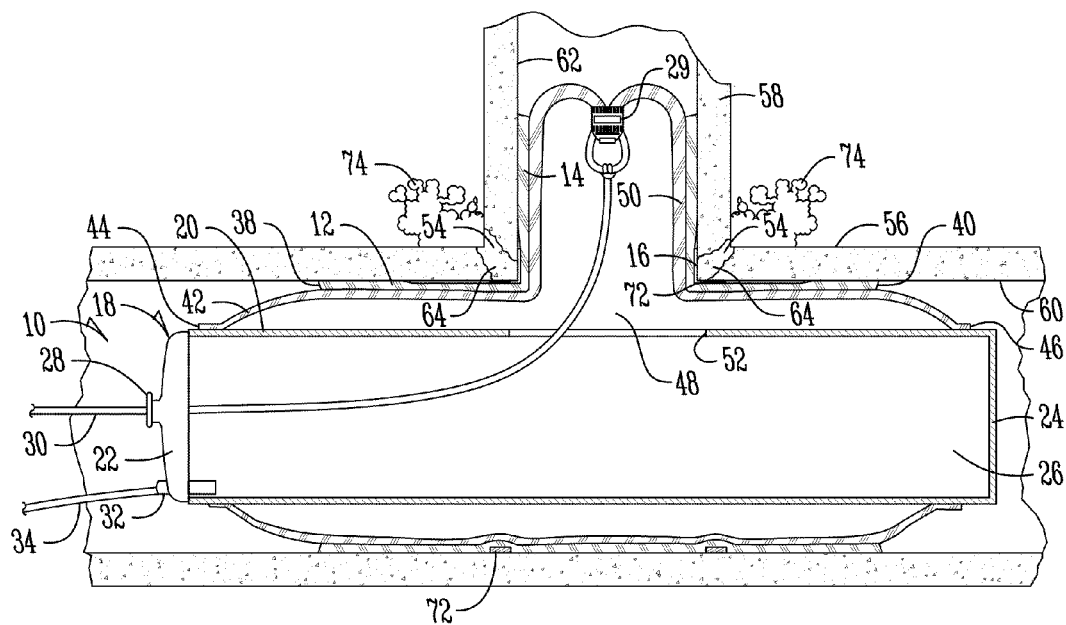
FIG. 3 is a view similar to FIG. 2, but showing the liner in its inflated position.

Referring to FIGS. 1-3, a liner assembly is generally designated by the numeral 10. Liner assembly 10 includes a launcher device 18 having mounted thereto a T-shaped or Y-shaped liner and bladder. The liner consists of a main liner member 12 and a lateral liner tube 14. In one embodiment, the main liner member 12 is a tube, but it can also be other shapes as well, such as a collar. The bladder consists of a main bladder tube 42, comprising a first end 44, a second end 46, and a main bladder tube opening 48, and a lateral bladder tube 50. In the particular configurations shown in FIGS. 1-3, the liner and bladder are T-shaped, but they can also be Y-shaped to accommodate a lateral pipe line that intersects with a main pipe line at an oblique angle.

Launcher device 18 includes side walls 20, a first end 22, a second end 24, all of which form a launcher device cavity 26. The first end of the launcher device 22 includes a line inlet 28 through which a line 30 extends. Line 30 is attached to a closed bladder tube end 29. Also extending through the first end of the launcher device 22 is an air inlet 32, which is connected to an air hose 34. A T-shaped or Y-shaped bladder tube includes a main bladder tube 42 and a lateral bladder tube 50. Similarly, the T-shaped and Y-shaped liner includes a main liner member 12 and a lateral liner tube 14. The bladder is fitted on the interior of the liner.

As can be seen in FIG. 1, the preferred main liner member 12 is comprised of what is initially a flat sheet of material which is wrapped around the outside of the main bladder tube 42 and the launcher device 18. The main liner member 12 may include overlapping edges. The launcher device 18 includes a first end 22, a second end 24, and a launcher device opening 52. The lateral liner tube 14 is contained within the launcher device cavity 26 as shown in FIG. 2. Similarly, the lateral bladder tube 50 is contained within the cavity 26 and surrounds the lateral liner tube 14. In a preferred embodiment, both the main liner member 12 and the lateral liner tube 14 are comprised of a felt layer, which is the lining surface that contacts the interior surface of the host pipe, and a polymer coating is on the opposite surface. In addition, the main liner member 12 preferably forms a tubular shape having a first end 38, a second end 40, and a main liner member opening 36. The main liner member 12 can also take the shape of a collar.

While it is preferred that both the main liner member 12 and the lateral liner tube 14 are both resin absorbent, the main liner member 12 can also be formed from a non-resin absorbent material, as is disclosed in U.S. patent application Ser. No. 12/026,909, which is hereby incorporated by reference in its entirety.

FIGS. 2 and 3 show the liner assembly 10 within the main pipe line 56, which is connected to a lateral pipe line 58. The damaged portion of the pipe 54 is shown needing repair. Ground water 70 from outside the lateral pipe line 58 and the main pipe line 56 will seep through the damaged portion 54 and enter the interior of the main pipe line 60 and the interior of the lateral pipe line 62 generally at the junction 64 between the main and lateral pipe lines.

In order to prevent the seepage of the ground water 70, while also repairing the junction 64 between the main pipe line 56 and the lateral pipe line 58, a collar 16 is positioned about a portion of the liner assembly 10. In a preferred embodiment, the collar 16 is disc-shaped, with an aperture through the center, and is made of open cell foam material. One example of a suitable open cell foam material is filter foam, as supplied by Foam Factory, Inc., 22800 Hall Road, Clinton Township, Mich. 48036, but other sources of open cell foam may be used. It should be acknowledged and appreciated that the collar 16 can be of different shapes with the aperture at different locations, as well as being comprised of other resinous absorbent materials. However, it should be noted that the collar 16 is used as a carrier to transport an expandable liquid grout material to a pipe juncture, and that all or nearly all of the material leaves the collar when pressed against a pipe leaving the collar with minimal thickness. This is illustrated in FIG. 3, where the collar 16 has been compressed to minimal thickness with the grout material having penetrated through the damaged portion 54 of the junction 64 between the main pipe 56 and the lateral pipe 58 and to an area in the soil surrounding the pipe junction 64.

In one embodiment, the collar 16 is disposed on the main liner member 12 about the main liner member opening 36. In addition, the collar 16 is impregnated with either a hydrophilic or hydrophobic material capable of curing and hardening, while also expanding in the presence of water. In a preferred embodiment, a liquid hydrophobic material is used that when cured becomes regid. The preferred hydrophobic material is a 2-part hydrophobic urethane thermoset resin. When parts A and B are mixed, the combination will begin to cure and harden, but will not expand unless it comes into contact with water during the curing process. One example of a suitable hydrophobic material is THR2, manufactured by Avanti International of 822 Bay Star Blvd., Webster, Tex. 77598, but other manufacturers and model numbers may be used, including foam hydrophobic materials that when cured become flexible, not rigid.

In another embodiment of the invention, the collar 16 is impregnated with a liquid hydrophilic material. The hydrophilic material is a one part formulation, which will not react at all unless in the presence of water. In the presence of water, the hydrophilic material will expand into a foam-like material that is flexible, sealing water from the interior of a pipe juncture. One example of a suitable hydrophilic material is AV202 manufactured by Avanti International of 822 Bay Star Blvd., Webster, Tex. 77598, but other manufacturers and model numbers may be used.

To position the collar 16, a short portion of the lateral liner tube 14 is extended from the launcher device opening 52 and the collar 16 is stretched over the portion of the lateral liner tube 14, as seen in FIG. 2. This position of extending a short portion of the lateral liner tube 14 out of the launcher device opening 52 referred to as the "jump start" position. With the lateral liner tube 14 in the "jump start" position, the collar 16 will less likely fall off as the liner assembly 10 is moved through the main pipe 56. Additionally, elastic or rubber bands (preferably hydrophilic) 72 may be used to further constrict the collar 16. The bands 72 are fully disclosed and described in U.S. Pat. No. 6,994,118, which is herein incorporated by reference in its entirety.

FIG. 2 shows the liner assembly 10 moved within the main pipe line 56 adjacent the lateral pipe line 58. The launcher device opening 52 is registered with a junction 64 between a lateral pipe line 58 and main pipe line 56. This alignment is done with a TV camera (not shown). The lateral bladder tube 50 and the lateral liner tube 14 are contained within the launcher device cavity 26. It should be noted that the lateral liner tube 14 extends within the lateral tube 50 in FIG. 2; whereas, the main liner member 12 and the collar 16 remain outside the main bladder tube 42 on the exterior of the launcher device 18.

Air pressure is introduced in the cavity 26 through air hose 34, urging of the main liner member 12 and a portion of the collar 16 into contact with the interior wall of the main pipe 60. Continued air pressure causes the lateral bladder tube 50 and the lateral liner tube 14 to invert outwardly through the launcher device opening 52 into the lateral pipe line 58 from the position shown in FIG. 2 to the position shown in FIG. 3. While air is the preferred pressurized material, other gases or fluids may be used. It should be noted that this inversion process causes the lateral liner tube 14 to be placed on the outside of the lateral bladder tube 50 once the inversion is complete, as shown in FIG. 3. In this position, the collar 16 is positioned in the junction 64 between the interior of the main pipe 60 and the interior of the lateral pipe 62. Pressure within the cavity 26 is maintained until all or nearly all of the hydrophobic material has been expelled from the collar 16 and into the damaged portion of pipe 54 and the surrounding soil by way of cracks and other defects. At this point, the collar 16 will have negligible thickness. It is also preferred that the pressure be maintained until the liquid hardenable material impregnated into the main liner member 12 and the lateral liner tube 14, preferably a resin activated with a catalyst, cures and hardens.

The ground water 70, as designated by the arrows in FIG. 2, will generally seep through the soil (not shown) towards the junction 64 between the main pipe line 56 and the lateral pipe line 58. However, when the ground water 70 interacts with the hydrophobic material, the hydrophobic material expands both in the soil around the pipe juncture 64 and in the cracks, holes, and other defects of the damaged portion of the pipe 54.

FIG. 3 shows the area adjacent the junction 64 of the main pipe line 56 and the lateral pipe line 58 after the hydrophobic material has been forced through the damaged portion 54 of the pipe and has been introduced to the presence of water (i.e., ground water 70). The hydrophobic material will expand to form a hydrophobic foam 74. The hydrophobic foam 74 cures, creating an impenetrable area to keep water from reaching the junction 64 of the main pipe line 56 and the lateral pipe line 58. Thus, the junction 64 is repaired by the hydrophobic material. The hydrophobic material from the collar 16 repairs the junction 64 and creates a water tight seal between the T-shaped or Y-shaped liner and the junction 64 within the interior of the main pipe 60 and the lateral pipe 62.

As described above, the two part hydrophobic material will begin to cure and harden when mixed, but will not expand unless in the presence of water. However, the lateral pipe 58 may be cleaned out with water (not shown) before the repair process takes place. The water used in cleaning the lateral pipe 58 may interact with the hydrophobic material to initiate expansion of the material while it also cures and hardens. The water used in cleaning may be used to activate the expansion process, which in turn further seals the juncture 64 from future leaking. Therefore, the end result will be a rigid, expanded material to seal the pipe, unless, as explained previously, a hydrophobic material that cures to a flexible state is selected.

When hydrophilic material is impregnated into the collar 16, an impermeable barrier (not shown) may also be used. The barrier would be set between the collar 16 and the main liner member 12. When the hydrophilic material is pressed into the pipe juncture 64 and the soil around the juncture, it will not react or cure unless introduced to the presence of water. Water will cause the preferred hydrophilic material to expand, but also to remain flexible. The hydrophilic material tends to cure as a flexible foam, and the impermeable barrier prevents the hydrophilic material from mixing with the thermoset resin from the main liner member 12. If the hydrophilic material selected is not compatible with the thermoset resin, mixing the two materials could prevent the main liner member from fully curing in a rigid form. This is not an issue when using a hydrophilic material wherein both the hydrophilic material and the resin-impregnated liner cure into a rigid state.

Although the precise dimensions of the collar 16 are not necessarily critical to the present invention, a disc-shaped collar having an outer diameter twice that of the lateral pipe and an aperture half the diameter of the lateral pipe has been found suitable for most sewer pipe applications.

Once the main liner member 12 and lateral liner tube 14 have had time to cure and harden, the main bladder tube 42 and the lateral bladder tube 50 are deflated. The line 30, attached at the closed bladder tube end 29, is pulled through the line inlet 28 until the lateral bladder tube 50 is everted completely back into the cavity 26 of the launcher device 18. The launcher device 18, main bladder tube 42, and lateral bladder tube 50 can then be removed from the main pipe line 56. The CIPP lateral liner tube 14 and main liner member 12 remain in the main pipe line 56 and the lateral pipe line 58, thus repairing the junction 64 between the main pipe 56 and the lateral pipe 58, as well as a portion of the lateral pipe line 58. The expanding grout material forced out of the collar 16 remains in the junction 64 between the lateral pipe line 58 and the main pipe line 56 and outside of the pipe lines, forming a curtain of grout to protect the juncture 64 from leaks and issues that arise therefrom.

In addition, there may be instances where the lateral pipe line 58 is very long. In these cases, a longer than normal lateral liner tube 14 must be used to repair and renew the lateral pipe line 58. To account for the larger lateral liner tube, a lay flat hose (not shown) may be attached to an open end of the launcher device 18 to enlarge the cavity 26. The lateral liner tube 14 and lateral bladder tube 50 may be extended into the lay flat hose and then inverted through the hose and the launcher device 18 and into the lateral pipe line 58, where the lateral liner tube 14 will cure and harden, thus repairing the pipe.

Figure 4:
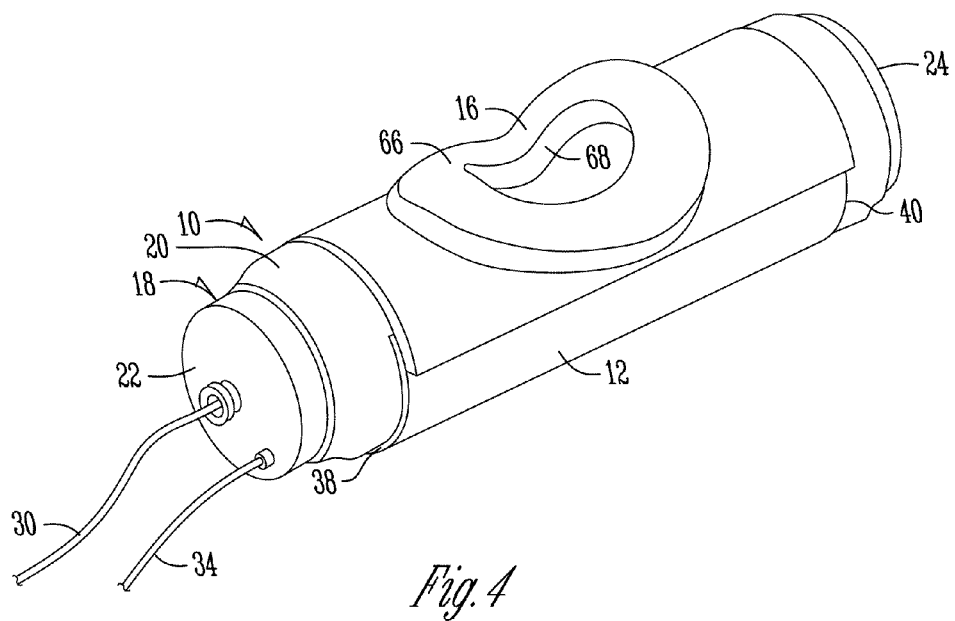
FIG. 4 is a perspective view of an alternative embodiment of a liner assembly for repairing the junction between a main pipe line and a lateral pipe line.
Figure 5:
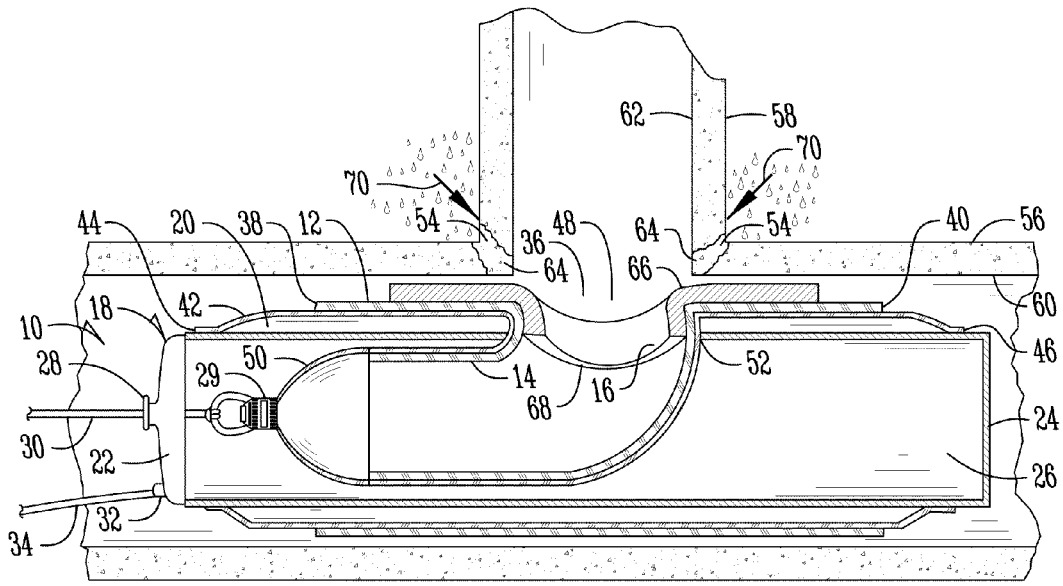
FIG. 5 is a sectional view of a main pipe line and a lateral pipe line showing the device of FIG. 4.
Figure 6:
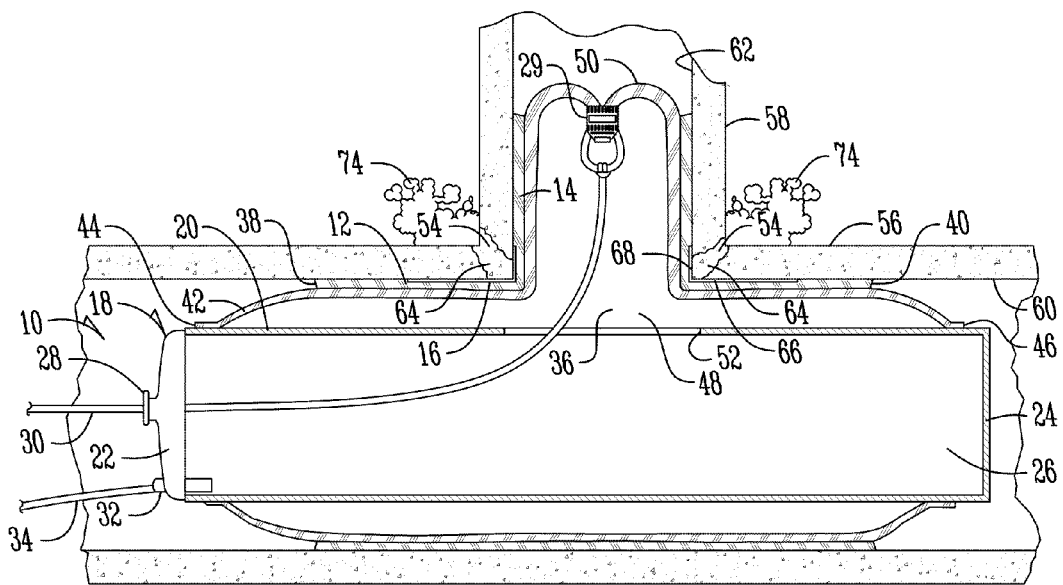
FIG. 6 is a view similar to FIG. 5, but showing the liner in its inflated position.

FIGS. 4, 5 and 6 illustrate an alternative embodiment of the present invention wherein the collar 16 has a top hat shape including a first section 66 and a second section 68. As can be seen in FIG. 4, the collar 16 is preferably positioned on the main liner member 12 such that first section of the collar 66 is positioned adjacent the main liner member opening 36 and the second section of the collar 68 extends at least partially into the cavity of the launcher device 26.

When air pressure is introduced into the launcher device cavity 26 through air hose 32, the lateral bladder tube 50, lateral liner tube 14, and second section of the collar 68 invert outwardly through the launcher device opening 52 into the interior of the lateral pipe line 62 from the position shown in FIG. 5 to the position shown in FIG. 6. In this particular embodiment, it should be noted that the inversion process causes the second section of the collar 68 to be positioned between the lateral liner tube 14 and the interior of the lateral pipe 62 and the first section of the collar 66 to be positioned between the main liner member 12 and the interior of the main pipe 60. Again, it is preferred that the collar be made of open cell foam material and impregnated with either a hydrophilic or hydrophobic material capable of expanding into a hydrophilic or hydrophobic foam 74 in the presence of water, as shown in FIG. 6. However, it will be appreciated in the art that the collar 16 both be made of other material and contain a resin or grout of another kind.

Figure 7:
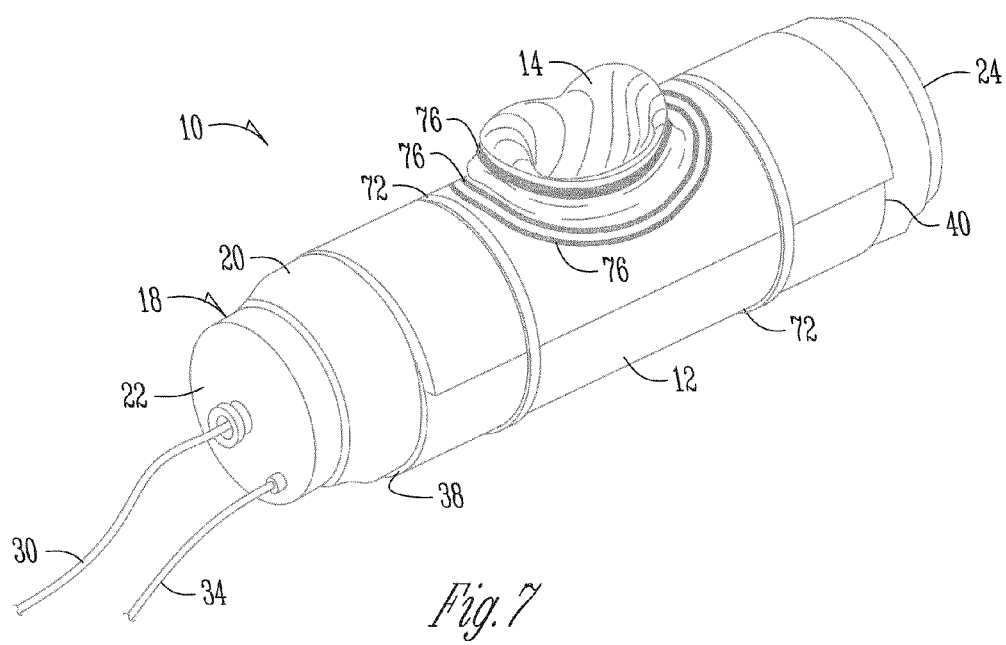
FIG. 7 is a perspective view of another alternative embodiment of the liner assembly.

The invention also includes an alternative embodiment that does not make use of a collar or like transport member for the hydrophobic or hydrophobic material. Rather, a hydrophobic or hydrophobic material of the type previously disclosed is made in a highly viscous form, which can be extruded in a bead around the juncture between the main liner member and the lateral liner tube. This is illustrated in FIG. 7 where the collar is replaced with one or more beads 76 of hydrophobic or hydrophobic material that forms a ring around the liner juncture. When the main liner member and lateral liner tube are urged outwardly toward the host pipe lines, the bead 76 of hydrophobic or hydrophilic material is forced under pressure into the pipe fractures, and, depending upon conditions in the pipe lines, a portion of the material can migrate to the outside of the pipe lines. Again, the hydrophobic or hydrophilic material will expand in the presence of water to provide an effective seal for the pipe lines.

Although various embodiments have been illustrated wherein the lateral liner tube is inverted into the lateral pipe, the present invention is also suitable for use in applications where the lateral liner tube is pulled or pushed into position, as is known in the art.

The invention has been shown and described above with reference to the preferred embodiments, and it is understood that many modifications, substitutions and additions may be made which are within the intended spirit and scope of the invention. The invention is only to be limited by claims pended hereto.

What is claimed is:

1. A liner assembly for lining the junction between a main pipe and a lateral pipe, comprising:
   a main liner member having a main liner member opening therein;
   a lateral liner tube extending from the main liner member about the main liner member opening and adapted to be located from a position at least partially within the main liner member to a position at least partially within the lateral pipe;
   a collar disposed at least partially on the main liner member adjacent the main liner member opening; elastic bands disposed at least partially around the collar and the main liner member to hold the collar in place; an expanding bladder;
   wherein the collar is impregnated with a liquid hydrophobic or hydrophilic material capable of curing and hardening and the material expanding in the presence of water;
   wherein the lateral liner is adapted to be inverted into the lateral pipe; and
   wherein the collar is compressed by the expanding bladder such that the liquid hydrophobic or hydrophilic material is substantially expelled from the collar and at least partially into a damaged portion of the main or lateral pipe.

2. The liner assembly of claim 1 wherein the collar comprises a first section disposed on the main liner member and a second section extending along a portion of the lateral liner tube.

3. The liner assembly of claim 1 wherein the main liner member has a tubular shape.

4. The liner assembly of claim 1 wherein the main liner member is a collar.

5. The liner assembly of claim 1 wherein the collar is comprised of an open cell foam material.

6. The liner assembly of claim 1 wherein the main liner member and the lateral liner tube are comprised of a resin absorbent material.

7. The liner assembly of claim 6 wherein a resinous material capable of curing and hardening is applied to the lateral liner tube and the main liner member.

8. The liner assembly of claim 1 wherein the collar is disc-shaped.

9. The liner assembly of claim 1 wherein the hydrophobic material cures forming a rigid material.

10. A liner assembly for lining the junction between a main pipe and a lateral pipe, comprising:
    a main liner member having a first end and a second end and a main liner member opening there between;
    a lateral liner tube extending from the main line member about the main liner member opening and adapted to be located from a position at least partially within the main liner member to a position at least partially within the lateral pipe;
    a collar having a first section disposed on the main liner member adjacent the main liner member opening and a second section extending at least partially from the main liner member about the main liner member opening; elastic bands disposed at least partially around the collar and the main liner member to hold the collar in place; an expanding bladder;

wherein the collar is impregnated with a hydrophilic or hydrophobic material capable of curing and expanding in the presence of water;

wherein the lateral liner is adapted to be inverted into the lateral pipe; and wherein the collar is compressed by the expanding bladder such that the liquid hydrophobic or hydrophilic material is substantially expelled from the collar and at least partially into a damaged portion of the main or lateral pipe.

11. The liner assembly of claim 10 wherein the main liner member has a tubular shape.

12. The liner assembly of claim 10 wherein the collar is comprised of an open cell foam material.

13. The liner assembly of claim 10 wherein the main liner member and the lateral liner tube are comprised of a resin absorbent material.

14. The liner assembly of claim 10 wherein a resinous material capable of curing and hardening is applied to the lateral liner tube and the main liner member.

15. The liner assembly of claim 10 wherein the first section of the collar is disc-shaped.

16. A liner assembly for lining the junction between the main pipe and a lateral pipe, comprising:
   a main bladder tube;
   a lateral bladder tube;
   a lateral liner tube extending at least partially within the lateral bladder, wherein the lateral liner tube can be operably positioned to an inverted position at least partially outside the lateral bladder tube;
   a main liner member joined to an end of the lateral liner tube about an opening in the main liner member;
   wherein the lateral liner tube and the lateral liner tube positionable between a position at least partially within the main bladder tube to a position at least partially within the lateral pipe;
   a collar disposed at least partially on the main liner member adjacent the main liner member opening and at least partially surrounding a partially inverted portion of the lateral liner tube; elastic bands disposed at least partially around the collar and the main liner member to hold the collar in place; an expanding bladder;
   wherein the collar is impregnated with either a hydrophilic or hydrophobic material capable of curing and expanding;
   wherein the lateral liner is adapted to be inverted into the lateral pipe; and
   wherein the collar is compressed by the expanding bladder such that the liquid hydrophobic or hydrophilic material is substantially expelled from the collar and at least partially into a damaged portion of the main or lateral pipe.

17. The liner assembly of claim 16 wherein a resinous material capable of curing and hardening is applied to the lateral liner tube and the main liner member.

18. The liner assembly of claim 16 further comprising a launcher device having a first end and an opposite second end and a launcher device opening there between.

19. The liner assembly of claim 18 further comprising the main bladder tube being outside and surrounding the launcher device and the lateral bladder tube extending through the launcher device opening and into the inside of the launcher device.

20. The liner assembly of claim 19 further comprising the main liner member being outside and at least partially surrounding the launcher device, and the lateral liner tube extending through the launcher device opening and into the inside of both the launcher device and the lateral bladder tube.

* * * * *